United States Patent [19]

Imasaka et al.

[11] Patent Number: 4,739,212
[45] Date of Patent: Apr. 19, 1988

[54] ULTRASONIC MOTOR

[75] Inventors: Yoshinobu Imasaka, Higashiosaka; Hiroshi Yoneno, Shiki; Masanori Sumihara, Neyagawa; Akira Tokushima, Kyoto, all of Japan

[73] Assignee: Matsushita Electric Industrial Co., Ltd., Kadoma, Japan

[21] Appl. No.: 886,556

[22] Filed: Jul. 17, 1986

[30] Foreign Application Priority Data

Jul. 19, 1985 [JP] Japan .................. 60-160520
Aug. 20, 1985 [JP] Japan .................. 60-182042
Feb. 17, 1986 [JP] Japan .................. 61-32331

[51] Int. Cl.$^4$ ............................................. H01L 41/08
[52] U.S. Cl. ...................................... 310/323; 310/328
[58] Field of Search ................................. 310/323, 328

[56] References Cited

U.S. PATENT DOCUMENTS 4,562,373 12/1985 Tokusima et al. .................. 310/328
4,634,916 1/1987 Okada et al. ....................... 310/323

Primary Examiner—Mark O. Budd
Attorney, Agent, or Firm—Cushman, Darby & Cushman

[57] ABSTRACT

A contacting member of a composite material of organic fiber and resin is provided to an inner surface of either a rotor or a stator of an ultrasonic motor. Noise is suppressed, starting torque is better and wear is decreased.

7 Claims, 2 Drawing Sheets

ULTRASONIC MOTOR

FIELD OF THE INVENTION AND RELATED ART STATEMENT

1. Field of the Invention

The present invention relates to a motor, particularly to such a motor (hereinafter referred to as "ultrasonic motor") where the driving force is obtained by travelling waves of ultrasonic frequency vibration by using a piezoelectric element.

2. Description of the Related Art

An ultrasonic motor (, for example, in a U.S. patent application Ser. No. 706,387) comprises a rotor and a stator provided with a piezoelectric element. The rotor and the stator contact with a certain pressure each other. The stator is vibrated by the vibration of travelling waves of the piezoelectric element. The contact and pressure conditions of the stator and the rotor are one important factor related to starting torque, no-load rotation number, motor energy conversion efficiency and useful life of the ultrasonic motor. Therefore, the contact parts of the rotor and the stator are significant. Also, the material of the contact part is important.

When metal is used as the material of the contact parts, the surface of the contact part should be made very smooth, eg on the order of $\mu m$ by extremely precise processing or working. Furthermore, under the ultrasonic frequency vibration, a considerable noise is produced by the contacting of the metal contact parts, this being a large disadvantage for practical use.

When rubber-containing asbestos is used as the material of the contact part to decrease the noise, the capability of the ultrasonic motor, for example, the starting torque, the no-load rotation number and motor efficiency become inferior because of the wear caused by the friction of the contact parts. Therefore, the lifetime of the ultrasonic motor is very short.

OBJECT AND SUMMARY OF THE INVENTION

The present invention intends to offer such an ultrasonic motor which can resolve the above-mentioned problems of the conventional ultrasonic motor. That is, the ultrasonic motor of the present invention has such advantages that: (1) noise is not produced at driving of the motor, (2) the driving force (torque) generated by the contact of the rotor and the stator, is large, and (3) amount of the wear produced by the friction of the contact parts at the rotation is very small. Therefore, the capability of the ultrasonic motor is stably maintained for a long time.

The ultrasonic motor in accordance with the present invention comprises:

a stator provided with a piezoelectric element, the piezoelectric element being for vibrating the stator by travelling waves of ultrasonic frequency, a rotor to be rotated by contacting the stator, and a contact member of composite material provided on an inner surface of an alternative of the stator or the rotor, the contact member being a composite material of organic fiber and resin.

DESCRIPTION OF THE PREFERRED EMBODIMENTS

Figure 1:
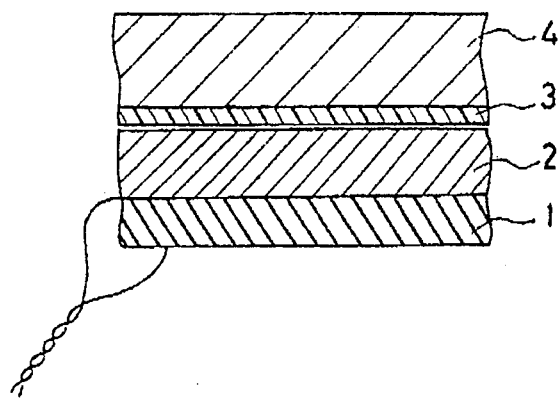
FIG. 1 is a cross-sectional view showing a main part of an embodiment of an ultrasonic motor of the present invention.

FIG. 1 shows a cross section of a main part of an ultrasonic motor of the present invention. A stator 2 is provided with a transducer for transducing an electric energy to mechanical vibration, for example, a piezoelectric element 1 at its outer surface. One piezoelectric element 1 is, for example, divided into 4 parts. The parts of the piezoelectric element 1 are driven in order, thereby generating the travelling waves. Otherwise, plural piezoelectric elements 1 can be used for generating the travelling waves. Plural protrusions (FIG. 2) 6 are disposed forming a circle on the inner surface of the stator 2. The protrusions 6 are provided for generating a large vibration. A rotor 4 is provided with an element 3 of composite material at its inner surface.

Figure 2:
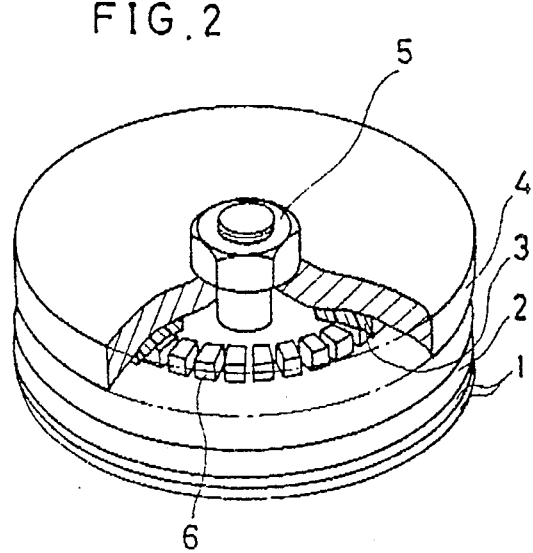
FIG. 2 is a partial cutaway perspective view showing an embodiment of a disk-shaped ultrasonic motor of the present invention.
Figure 3:
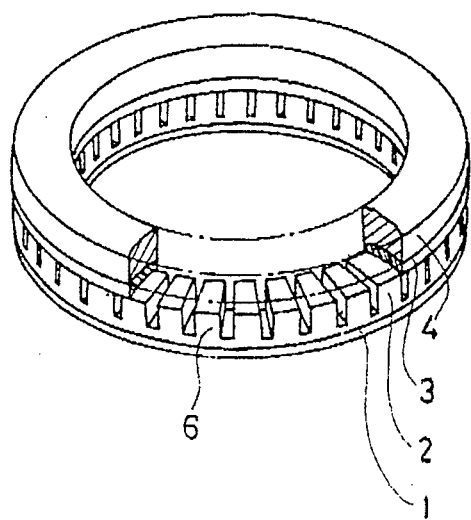
FIG. 3 is a partial cutaway perspective view showing an embodiment of a ring-shaped ultrasonic motor of the present invention.
Figure 4:
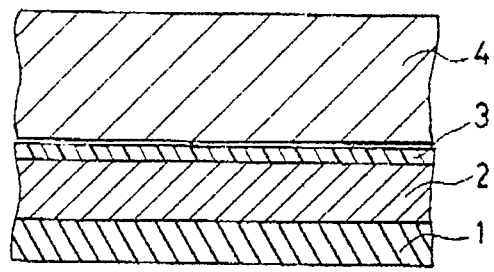
FIG. 4 is a cross-sectional view showing a main part of another embodiment of the ultrasonic motor of the present invention in which an element of composite material is provided to a stator.

FIG. 2 shows a disk-shaped ultrasonic motor embodying the present invention and FIG. 3 shows a ring-shaped ultrasonic motor embodying the present invention, wherein the rotors 4 of both are shown partially cut. The rotor 4 and the stator 2 are made contacting each other with a certain pressure by a nut 5 as shown in FIG. 2 or a magnetic force as shown in FIG. 3. The ultrasonic motor of the present invention can have any shapes of the rotor 4 and the stator 2. The element 3 of composite material can also be fixed to the inner surface of the stator 2 as shown in FIG. 4. The element 3 of composite material is made of organic fiber and resin, and gives a superior capability to the ultrasonic motor. The constitution, effects and so on of the element 3 of composite material are described as follows.

(1) A Case in which an organic fiber of a discontinuous filament type was used:

As the resin, 9 weight parts of resin of bismaleimide-triazine added with about 30 weight % flexibility-giving agent was used. For example, 9 weight parts in solid content of BT2112 (trade name) resin (sold on a market, by Mitsubishi Gas Chemical Co., Inc.) was used. As the organic fiber, 1 weight part of pulp-type of aromatic polyamid fiber (for example, KEVLER (trademark) made by E. I. du Pont de Nemours and Co.) which was cut by 2 mm, was used. The above-mentioned resin and organic fiber were mixed for 10 minutes at room temperature by a pressure type mixer. The mixing operation made the discontinuous filament fiber dispersed uniform in the matrix resin. The mixed resin was preliminarily formed like a sheet and was preliminarily heated, thereby to eliminate solvent included in the sold BT 2112 resin. The mixed resin was hardened by pressing and heating for 2 hours under 200° C. and 200 kg/cm$^2$ by a compression molding machine, and thereby sheet-shaped element A of composite material of 0.5 mm thick was obtained.

In this case, the capability of the ultrasonic motor was as follows. The sheet-shaped element A was cut into a given shape and size and fixed to the inner surface of the rotor 4 made of metal by using known adhesive sold on a market. The rotor 4 was made contacting with pressure to the stator 2 by using the nut 5 as shown in FIG. 2.

The result when such ultrasonic motor was driven by vibration of travelling wave of the piezoelectric element 1, is shown in Table 1.

A starting torque of the ultrasonic motor has a correlation with a frictional coefficient between the rotor 4 and the stator 2. The larger friction coefficient a combination of the rotor and the stator has, the larger starting torque, hence the more superior capability the motor has. The kinetic friction coefficient of the sheet-shaped element A of the embodiment was 0.6, which was fairly large in comparison with 0.1–0.4 of other resin such as nylon, Teflon (trademark). Therefore, large starting torque of the motor was obtained. The ultrasonic motor energy conversion efficiency is defined by a ratio of mechanical output power to electric input power. The efficiency with regard to the sheet-shaped element A was so high as 38%. The wear amount after 1 million rotation numbers of the rotor 4 was detected by measuring the depth of wear of the sheet-shaped element A with a surface shape measuring meter after the rotor 4 rotates 1 million times. The driving condition was that the load was 300 gf·cm with step rotation of rotary angle 90° and the apparent (average) rotation number was 100 rpm. The maximum rotation number was about 600 rpm. The ultrasonic frequency is 70 KHz. The number of the protrusions 6 is 48. The diameter of the rotor 4 is 40 mm. The thickness of the rotor 4 is 3 mm. The thickness of the element 3 of composite material is 0.3 mm. The thickness of the stator 2 is 5.0 mm. The diameter of a circular part of the protrusions 6 is 23.5 mm. The voltage applied to the piezoelement 1 is 60 V. The sheet-shaped element A entirely excluded the fluctuation of the rotation and the noise. After the 1 million time rotations, the ultrasonic motor continually rotated under as same state as the initial conditions. Further, the wear amount was only 4.8 μm after 1 million rotation numbers.

TABLE 1

Capability of the ultrasonic motor with various kinds of sheet-shaped elements

| Sheet-shaped element | Starting torque gf · cm | No-load rotation rpm | Efficiency % | Wear amount after million rotations μm | Noise |
|---|---|---|---|---|---|
| A | 470 | 670 | 38 | 4.8 | |
| B | 540 | 640 | 33 | 11 | |
| C | 450 | 690 | 39 | 2.2 | |
| D | 450 | 680 | 37 | 5.1 | |
| E | 430 | 700 | 31 | 4.3 | |
| Comparison sample | 500 | 420 | 18 | 60 (a) | X |

(a) Abrasion amount after fifty thousand rotations
(b) Mark : good Mark X: poor

Further, the capabilities of the ultrasonic motor provided with a sheet-shaped element B which contained the aromatic polyamid fiber of 5 volume % and also the capability of the ultrasonic motor provided with a sheet-shaped element C which contained the aromatic polyamid fiber of 30 volume % are measured, and the results are shown in the Table 1. A sheet which did not contain the aromatic polyamid fiber was not able to bear the rotation because the sheet was worn after about a hundred times as quickly as the sheet-shaped element A. The sheet-shaped element containing the aromatic polyamid fiber of 2 or less volume % was not preferable because the wear characteristics was inferior. The sheet-shaped element containing the aromatic polyamid fiber of 70 or more volume % was also not preferable because the mixing processing was difficult or took a long time. The sheet-shaped element containing the aromatic polyamide fiber of over 50 volume % was not preferable because the molding is difficult. The sheet-shaped element containing the aromatic polyamide fiber of over 30 volume % was also not preferable because the fiber was not easy to be scattered in the matrix resin. As a result, the sheet-shaped element which contains the aromatic polyamid fiber of 2–50 volume % is preferable and 2–30 volume % is fairly preferable.

In the above all sheet-shaped elements, the flexibility giving-agent was 30 weight %. When a sheet-shaped element D containing the flexibility giving agent of 10 weight % and a sheet-shaped element E containing the flexibility giving agent of 20 weight % had superior motor capability as shown in Table 1.

Thus the amount of wear caused by the friction of the contact parts was extremely small because of the bis-maleimide-triazine resin which is very excellent heat-resistant resin of polyimide group and of the aromatic polyamid fiber scattered in the resin. Accordingly the decreasing and the deterioration of the capability of the motor was suppsressed. Further, since the sheet-shaped element contained the flexibility-giving agent, the noise at the rotation was extremely low in comparison with such noises caused by the friction between the metal parts or between the metal part and the hard resin part.

Further the above-mentioned sheet-shaped elements had a fairly large friction coefficient, and therefore large torque could be obtained.

For comparison, the capability of the conventional ultrasonic motor is shown in Table 1, when a sheet including asbestos whose friction coefficient is fairly large, was used under the same conditions as the sheet-shaped element A. In the comparison sample, the rotation stopped after only fifty thousand times of rotation. The wear amount was so large as about 60 μm. The rotation velocity decreased as the passage of time. The noise was large. Accordingly, the ultrasonic motor was poor.

In the above-mentioned embodiments, the aromatic polyamide fiber was used as the organic fibers but phenol fiber, polyester fiber and other organic fiber can be used.

(2) A Case in which organic fiber of felt type was used:

Epoxy resin (EPICOTE (trademark) 828 made by Shell Chemical Co., Ltd. and diaminodiphenylsulfone as hardening agent) was vacuum-impregnated into felt (weight 300 g/m²) of aromatic polyamide fiber (KEVLER (trademark) made by E. I. du Pont de Nemours and Co.) and the impregnated felt was heated being compression-molded. Thus a sheet-shaped element of 1 mm thick containing fiber of 70 weight % and resin of 30 weight % was obtained.

The friction coefficient of the sheet-shaped element is 0.39. With regard to the ultrasonic motor provided with the sheet-shaped element, the initial starting torque is 640 gf·cm and the starting torque after 1 million times of rotation was 630 gf·cm. Thus the fluctuation of the starting torque was small. The wear thickness after a million relations was as small as 2.5 μm. The noise was not produced.

Further, various kinds of resins in a left column of Table 2 were vacuum-impregnated into felts of various kinds of organic fibers in a right column of Table 2. The impregnated felt was heated with compression-molded. Thus various sheet-shaped elements of 1 mm thick were obtained. The friction coefficients of these various sheet-shaped elements and the capabilities of the ultrasonic motor provided with the various sheet-shaped elements are shown in Table 3.

As apparent from the Table 3, the all sheet-shaped elements have large initial friction coefficient. The starting torques at the initial and after million rotation numbers were not very different to each other. Therefore, the friction coefficient was stable. The wear thickness of each sheet-shaped element after a million rotation numbers were as small as 50 μm or less. Further the unusual noise was not produced with regard to each sheet-shaped element.

TABLE 2

| Composition | Felt | Resin |
|---|---|---|
| F | Aromatic polyamide fiber KEVLER made by E.I. du Pont de Nemours and Co. Weight 300 g/m² | Phenol resin MYLEX XL (trademark) made by Mitsui Toatsu Chemicals, Inc. |
| G | Aromatic polyamide fiber KEVLER made by E.I. du Pont de Nemours and Co. Weight 200 g/m² | Bismaleimide-triazine resin BT resin (trade name) made by Mitsubishi Gas Chemical Co., Inc. |
| H | Aromatic polyamide fiber HM-50 (trade name) made by Teijin Ltd. Weight 300 g/m² | Polyimide resin KERIMID (trademark) made by Rhone-Poulenc S.A. |
| I | Aromatic polyamide fiber CONEX (trademark) made by Teijin Ltd. Weight 150 g/m² | Phenol resin MYLEX RN (trademark) made by Mitsui Toatsu Chemicals, Inc. |
| J | Phenol resin KYNOL (trademark) made by Nippon Kynol, Inc. Weight 200 g/m² | Bismaleimide-triazine resin BT resin made by Mitsubishi Gas Chemical Co., Inc. |
| K | Polyester fiber TETRON (trademark) made by Toray Industries, Inc. Weight 150 g/m² | Epoxy resin EPICOTE made by Shell Chemical Co., Ltd. |

TABLE 3

| Measured item | Composition | | | | | |
|---|---|---|---|---|---|---|
| | F | G | H | I | J | K |
| Friction coefficient (initial) | 0.45 | 0.34 | 0.40 | 0.48 | 0.38 | 0.35 |
| Starting torque (initial) gf-cm | 720 | 620 | 660 | 750 | 600 | 580 |
| Starting torque (after million rotations) gf-cm | 650 | 610 | 620 | 610 | 520 | 520 |
| Wear thickness (after million rotations) μm | 40 | 15 | 27 | 48 | 35 | 40 |
| Noise at rotation | nil | nil | nil | nil | nil | nil |

(3) Case in which organic fiber of cloth type was used:

Phenol resin (MYLEX XL made by Mitsui Toatsu Chemicals, Inc.) was vacuum-impregnated into cloth (195 denier, density of 34 strings/25 mm, weight 60 g/m², plain fabrics) of aromatic polyamide fiber (KEVLAR made by E. I. du Pont de Nemours and Co.). The vacuum-impregnated cloth was heated with compression-molded and the sheet-shaped element of 0.5 mm thick containing fiber of 65 weight % and resin of 35 weight % was obtained.

The friction coefficiency of the sheet-shaped element was 0.52. The capability of the ultrasonic motor provided with the sheet-shaped element was such that the initial starting torque was 730 gf·cm and the starting torque after 1 million rotations with 710 g·cm. Thus the starting torque was large and the fluctuation of the starting torque was small. The wear thickness after million rotation numbers were so small as 12 μm. Unusual noise was not produced. Further the deterioration of the capability of the ultrasonic motor, caused by the produced wear powder was not found.

(4) Other cases in which various kinds of aromatic polyamide fibers types and various kinds of resins were used:

Sheet-shaped elements of 1 mm thick made of various kinds of shapes of aromatic polyamide fibers and various kinds of resins as shown in Table 4 was molded.

TABLE 4

| Composition | Aromatic polyamide fiber | | Resin |
|---|---|---|---|
| | Shape of fiber | Fiber content Volume % | |
| L | KEVLER made by E. I. du Pont de Nemours and Co. Plain fabrics cloth, 1100 Denier Density 17 strings/25 mm Weight 250 g/m² | 65 | Polyimide resin KERIMID (trademark) made by Rhone-Poulenc S.A. |
| M | KEVLER made by E. I. du Pont de Nemours and Co. Discontinuous filament (Average length 2 mm) Fiber diameter 13 μm | 30 | Epoxy resin EPICOTE 152 made by Shell Chemical Co., Ltd. and Diaminodiphenyl-sulfone |
| N | KEVLER made by E. I. du Pont de Nemours and Co. Discontinuous filament (Average length 12 mm) | 55 | Polyphenylene sulfide resin RYTON (trademark) made by Hodogaya Chemical Co., Ltd. |
| O | KEVLER made by E. I. du Pont de Nemours and Co. Pulp-type fiber Average length 2 mm | 70 | Phenol resin MYLEX RN made by Mitsui Toatsu Chemicals, Inc. |
| P | HM-50 (trade name) made by Teijin Ltd. Plain fabrics cloth, 400 Denier Weight 150 g/m² | 65 | Bismaleimide-triazine resin BT resin made by Mitsubishi Gas Chemical Co., Inc. |
| Q | HM-50 made by Teijin Ltd. | 25 | Poly arylate resin |

TABLE 4-continued

| Composition | Aromatic polyamide fiber | | | |
|---|---|---|---|---|
| | Shape of fiber | Fiber content Volume % | | Resin |
| | Discontinuous filament (Average length 3 mm) Fiber diameter 12 μm | | | U-POLYMER (trademark) made by Unitika, Ltd. |

The friction coefficients of the sheet-shaped elements and the capabilities of the ultrasonic motor provided with the sheet-shaped elements are shown in Table 5.

TABLE 5

| Item | | Composition | | | | | |
|---|---|---|---|---|---|---|---|
| | | L | M | N | O | P | Q |
| Friction coefficient | | | | | | | |
| initial | — | 0.50 | 0.54 | 0.55 | 0.48 | 0.51 | 0.54 |
| Starting torque | | | | | | | |
| initial | gf-cm | 710 | 740 | 740 | 690 | 710 | 730 |
| after million rotations | gf-cm | 700 | 690 | 700 | 640 | 700 | 690 |
| Wear thickness (after million rotations) | μm | 10 | 38 | 16 | 25 | 12 | 45 |
| Noise at rotation | — | nil | nil | nil | nil | nil | nil |

As apparent from the Table 5, the friction coefficients at initial stage of the sheet-shaped elements was large. The initial starting torque and the starting torque after 1 million rotations were large. The fluctuation of the starting torque was small. Therefore, the ultrasonic motor has a long life. The wear thickness after 1 million rotations was as small as 50 μm or less. Further, unpleasant noise was not produced. The deterioration of the capability of the ultrasonic motor, caused by the produced wear powder, was not found in any sheet-shaped elements.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. An ultrasonic motor comprising:
    a stator provided with a piezoelectric element,
    said piezoelectric element being for vibrating said stator by travelling waves of ultrasonic frequency,
    a rotor, configured to be rotated by contacting said stator, and
    a contact member of composite material provided on an inner surface of one of: (a) said stator or (b) said rotor, the contact member being a composite material of organic fiber and resin.
2. An ultrasonic motor in accordance with claim 1, wherein
    said organic fiber is of a discontinuous filament type.
3. An ultrasonic motor in accordance with claim 2, wherein
    said organic fiber is of an aromatic polyamide fiber and scattered in said resin, and
    said organic fiber is 2–70 volume % of said member of composite material.
4. An ultrasonic motor in accordance with claim 1, wherein
    said organic fiber is of a felt type.
5. An ultrasonic motor in accordance with claim 4, wherein
    said organic fiber is selected from a group consisting of aromatic polyamide fiber, phenol fiber and polyester fiber.
6. An ultrasonic motor in accordance with claim 1, wherein
    said organic fiber is of a cloth type.
7. A motor as in claim 1 wherein said contact member is pressure contacted to said rotor or stator.

* * * * *